(12) United States Patent
Hall et al.

(10) Patent No.: US 11,794,284 B2
(45) Date of Patent: Oct. 24, 2023

(54) METHODS OF MANUFACTURING A WORKPIECE FIXTURE FOR SUPPORTING A WORKPIECE IN A PRECISION MANUFACTURING PROCESS; METHOD OF GENERATING A SUPPORT BLADE MACHINING PATTERN; AND TARGET MATERIAL FIXTURE

(71) Applicant: TANNLIN TECHNOLOGY LIMITED, Kilmarnock (GB)

(72) Inventors: James Stewart Hall, Kilmarnock (GB); James Graham Hall, Kilmarnock (GB); Jake Gillespie, Kilmarnock (GB); Scott McVey, Kilmarnock (GB); Michael Gallagher, Kilmarnock (GB)

(73) Assignee: TANNLIN TECHNOLOGY LIMITED, Kilmarnock (GB)

( * ) Notice: Subject to any disclaimer, the term of this patent is extended or adjusted under 35 U.S.C. 154(b) by 237 days.

(21) Appl. No.: 17/263,211

(22) PCT Filed: Jul. 4, 2019

(86) PCT No.: PCT/GB2019/051895
§ 371 (c)(1),
(2) Date: Jan. 26, 2021

(87) PCT Pub. No.: WO2020/025923
PCT Pub. Date: Feb. 6, 2020

(65) Prior Publication Data
US 2021/0283720 A1    Sep. 16, 2021

(30) Foreign Application Priority Data
Aug. 3, 2018   (GB) .................................. 1812704.3

(51) Int. Cl.
*B23K 26/38*        (2014.01)
*B23K 26/082*       (2014.01)
(Continued)

(52) U.S. Cl.
CPC ............ *B23K 26/38* (2013.01); *B23K 26/082* (2015.10); *B23K 26/0876* (2013.01); *B23K 37/0408* (2013.01); *B23K 2101/18* (2018.08)

(58) Field of Classification Search
CPC .............. B23K 26/702; B23K 37/0408; B23K 26/0876; B23K 26/082; B23K 26/38
See application file for complete search history.

(56) References Cited

U.S. PATENT DOCUMENTS

| | | | |
|---|---|---|---|
| 2002/0107607 A1* | 8/2002 | Sakai | B23K 26/0884 219/121.72 |
| 2014/0157610 A1* | 6/2014 | Garvey | G01B 21/04 33/503 |
| 2014/0303764 A1 | 10/2014 | Boyl-Davis et al. | |

FOREIGN PATENT DOCUMENTS

| | | | | |
|---|---|---|---|---|
| JP | H08132228 A | 5/1996 | | |
| JP | 2013131554 A | 7/2013 | | |
| WO | WO-2007134631 A1 * | 11/2007 | ............. | B23K 26/38 |

OTHER PUBLICATIONS

International Search Report, PCT/GB2019/051895, dated Nov. 12, 2019.

* cited by examiner

*Primary Examiner* — Thien S Tran
(74) *Attorney, Agent, or Firm* — MOSER TABOADA

(57) ABSTRACT

Disclosed are methods of manufacturing a workpiece fixture (10) and also a target material fixture (10), for use in precision manufacturing processes. A sheet material is supported on a generic material fixture (10) and the sheet material precision processed to form support blades (16, 18)

(Continued)

for a target workpiece fixture (10). Each support blade (16, 18) has a support locus and interstices are positioned in the support loci where a target pattern and the support loci coincide. Thus, there are no unnecessary clearances between the workpiece support (10) and the workpiece. The interstices that are present are located only where necessary to reduce or eliminate any interference between the precision manufacturing process and the fixture (10), when it is used in a precision process involving the target pattern.

20 Claims, 8 Drawing Sheets

(51) Int. Cl.
      *B23K 26/08*       (2014.01)
      *B23K 37/04*       (2006.01)
      *B23K 101/18*     (2006.01)

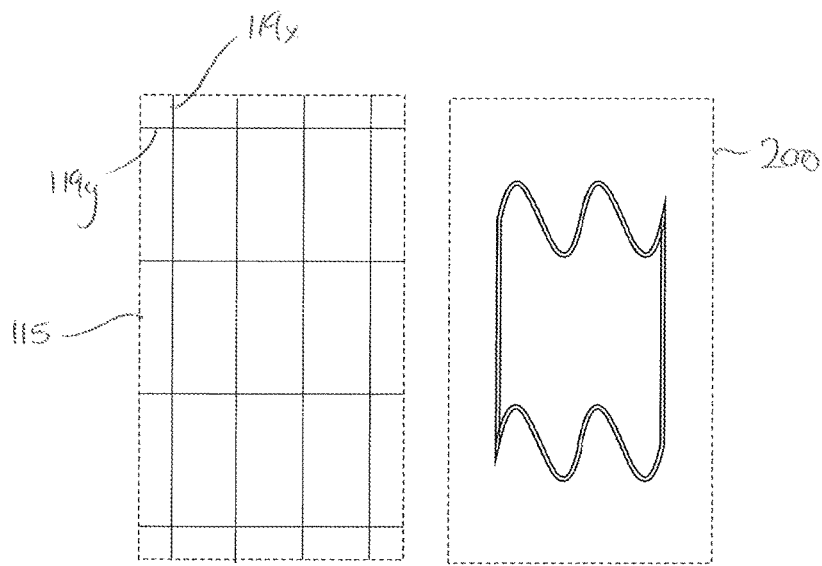
Figure 5(a)
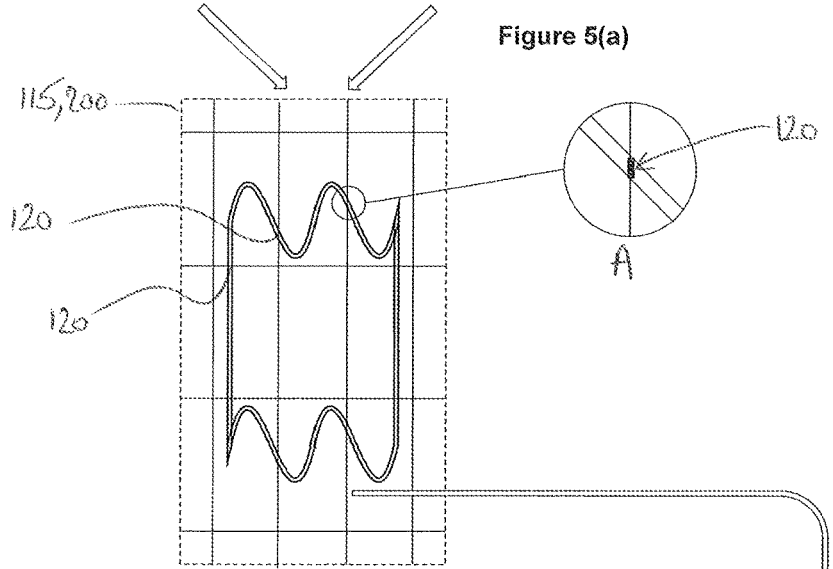
Figure 5(b)
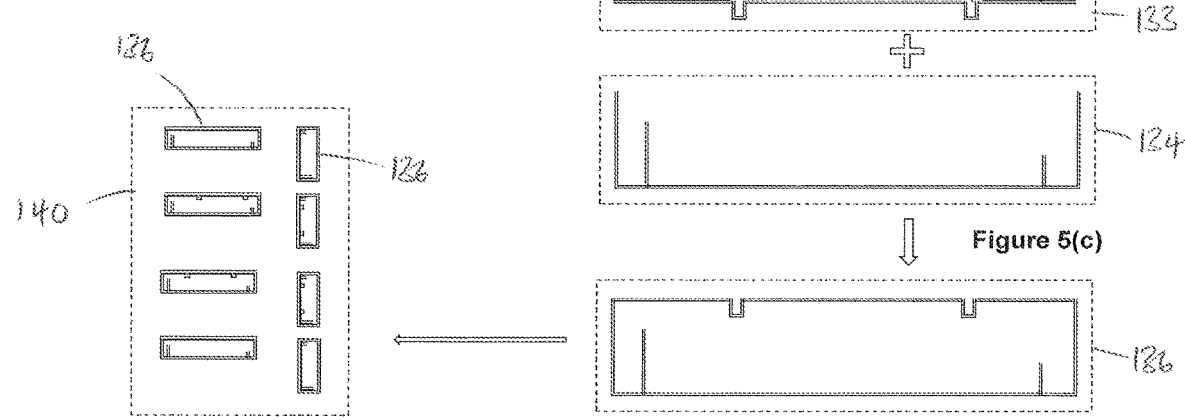
Figure 5(c)
Figure 5(e)  Figure 5(d)

METHODS OF MANUFACTURING A WORKPIECE FIXTURE FOR SUPPORTING A WORKPIECE IN A PRECISION MANUFACTURING PROCESS; METHOD OF GENERATING A SUPPORT BLADE MACHINING PATTERN; AND TARGET MATERIAL FIXTURE

FIELD OF THE INVENTION

The invention relates to the manufacture of material fixings or supports, for use in precision manufacturing, such as precision machining.

BACKGROUND TO THE INVENTION

During precision manufacturing processes, it is commonly required to support a workpiece in relation to a tool, such as a tool for robotic assembly or a machining tool or the like. Movement of the supported workpiece can adversely affect the accuracy of the manufacturing process and, in some cases also lead to damage of the material fixing.

For example, laser machining is commonly used for the precision manufacture of precision parts for use in a wide range of industries, including in electronics assembly, such as stencils or masks for solder paste printing of circuit boards, or templates for use in making other electronics components. Laser machining is also used to manufacture precision mechanical parts for the automotive, aerospace, personal care, medical and other industries. Laser machining may also be applied to a wide range of materials, including metal workpieces, ceramics and plastics.

Laser machining is one example of a number of related precision material processing and machining methods which require precise positioning and support of a workpiece. Other such processes include photochemical machining, electrical discharge machining, water jetting and precision mechanical CNC machining. Other precision manufacturing processes include electronic circuit board printing or assembly.

Common to all of these processes is the requirement for a precisely dimensioned supporting structure (commonly referred to as a "fixture"), with clearances between the fixture and the workpiece in selected position.

For example, in electronic circuit board assembly, components may be positioned to both sides of the board. Thus, a board may need to be supported without impinging on components already present. In addition, clearance may be required for parts such as terminals which are inserted all the way through a circuit board.

Fixtures for precision machining must be adapted to limit the degree collateral machining or etching of the fixture itself (which reduces its functional lifetime) and to avoid the plumes or debris from machining causing vibrations of the workpiece or otherwise adversely affecting the precision of the machining process.

In laser machining, for example, a laser beam is focused on a workpiece so as to heat the surface, causing material to be melted or sublimated away. CNC methods enable extremely precise, sub-micron control over the laser machining process and so finds application in a range of manufacturing processes.

During precision laser machining, a workpiece must be precisely positioned throughout the cutting or routing process, in order to achieve the micron or sub-micron precision required. Commonly, a clearance must also be provided below or in the shadow of the workpiece, to allow for a clean edge to be cut through or around portions of the workpiece and to limit any movement of the workpiece caused by machining or heating of the underlying support.

In precision laser machining and comparable processes, a workpiece is conventionally supported on a material fixture in the form of an interlocked lattice of metal "blades" formed from a sheet material such as mild steel, or in some circumstances nickel or stainless steel. Each blade is provided with regular triangular crenallations, such that a planar surface of the workpiece (which itself is commonly a sheet material) is supported upon an array of points—i.e. the tips of the crenallations—whilst limiting machining of the material fixture itself.

However, there will inevitably be at least some "overlap" between a machining pattern and a conventional material fixture, which results in damage to the fixture and/or variances during a manufacturing run or between multiple parts manufactured from a single workpiece. In addition, whilst the distances between the points in the array can be varied, there is an inherent trade-off between the degree of structural support that a fixture provides and the degree of overlap with the machining pattern.

Another approach to supporting a workpiece in precision manufacturing is to machine (typically by CNC mechanically machining) a required support pattern from a block or blocks of material. A fixture of this type is costly and time consuming to manufacture and may only be viable for particularly high volume and/or high value applications.

SUMMARY OF THE INVENTION

According to a first aspect of the invention there is provided a method of manufacturing a workpiece fixture, for supporting a workpiece in a precision manufacturing process; the method comprising:

providing a generic material fixture and a sheet material supported on the generic material fixture;

precision processing the sheet material to form support blades for a target workpiece fixture; each support blade having a support locus; the support locus of at least one said support blade having at least one interstice; and constructing a target workpiece fixture comprising the support blades; wherein the support loci together define a workpiece support and wherein the or each interstice is positioned based on where a target pattern and the support loci coincide.

In use of the target workpiece fixture, a workpiece is supported by the workpiece support. The interstices provide clearance between the fixture and the workpiece, where the workpiece support and the target pattern coincide.

Thus, there are no unnecessary clearances between the workpiece support and the workpiece. The interstices that are present are located to so as to reduce or eliminate any interference between the precision manufacturing process and the fixture, in use.

A workpiece or material "fixture" is a structure for supporting a workpiece or material (e.g. an item to be laser machined) in a fixed position during a precision manufacturing process. A fixture includes a workpiece support against which a workpiece or material rests, in use. A workpiece support is typically defined by the support loci of the support blades from which the fixture is constructed.

A "generic material fixture" is adapted to support a workpiece during precision material processing of a range of machining patterns (typically any pattern a given material processing apparatus is capable of following). Accordingly, a generic material fixture has a workpiece support provided with a regular pattern of interstices, for example defined by crenallations along the edges of constituent interlocking blades. In contrast the target workpiece fixture of the present invention is adapted for one particular target pattern. Moreover, precision processing of the support blades of the target workpiece fixture from the sheet material can be conducted more rapidly and efficiently, and typically with greater precision, than the manufacture of conventional "custom" support from a block of material.

By a "blade" we refer to a component part of the target support fixture (or any other fixture) formed from a sheet material.

By "locus" (plural loci) we refer to a set of points satisfying a required property; i.e. as defined by the shape and configuration of the workpiece to be supported.

A support locus of a support blade of a material fixture may be an edge, or a series of edges or points, extending along a length of the blade. A locus may be linear, to support a straight or flat workpiece or region of a workpiece. A support locus of may have a curvature or discontinuities, for example to support a curved workpiece or a region of a workpiece with a corner or edge.

Accordingly, in the target workpiece fixture, the support loci may be generally co-planar, and together define a workpiece support for a generally planar workpiece.

Alternatively, where the portion of the workpiece to be supported is for example concave or convex, or has one or more vertices or apices, the envelope of the workpiece support is correspondingly shaped to receive said portion of the workpiece.

An "interstice" is a gap or break in a generally continuous support locus (or portion thereof). An interstice gives rise to a clearance between a workpiece and the workpiece support material. The or each interstice of the target workpiece fixture is/are positioned where the target pattern coincides with a respective support locus.

An interstice may be a slot, channel or recess through the thickness of the sheet material; spaced apart from the support locus of the respective support blade. The form of an interstice may depend both on the configuration of the support locus and the target pattern.

A said interstice may be a slot or an indent in a said support locus. The slot may be squared or rounded in profile, or indeed any other suitable configuration.

A said interstice may be based on an outline of a surface of a workpiece to be supported, such as an outline of an electronic component extending from a circuit board.

An interstice may be any suitable dimension, as required for a particular purpose. Typically, an interstice (whether in the form of a slot or a channel) is dimensioned to provide a clearance around the coincidence(s) between the target pattern and the or each said support locus of the order of at least $10^2$-$10^4$ μm (in the direction along which the support locus extends). An interstice may have a depth (or a maximum depth) of up to around 1 mm, 5 mm or 1 cm. The depth may be governed, at least in part, by the dimension of the blade. An interstice may extend up to 10%, 20%, 50% or more of the depth of the blade (i.e. in the direction generally perpendicular from the support locus). By the depth of the interstice we refer to the maximum distance by which the interstice is set back from the adjacent regions of the support locus.

For example, a target pattern be a target processing pattern, such as a pattern of lines for laser cutting. The interstices may have a width to either side of the intersection between a line and a locus, to provide said clearance.

The sheet material may be any suitable type of material (e.g. a metallic material, such as mild steel) or materials (e.g. a laminated or coated material) and may be of any suitable thickness. It will be appreciated that the locus and other features of the outline of a support blade or any other blade processed therefrom will extend through the thickness of the sheet material. Thus, where we refer to an "edge" (e.g. of a locus) we refer to the or each surface extending generally directly between the faces of the sheet material.

Depending on the precision processing method employed, and the nature and thickness of the sheet material, said surfaces may at least on the micro or nanoscale extend include irregularities. For example, the edge(s) along the locus may be to some degree rounded, as reflects methods in which the material is melted or sublimated.

A "target pattern" is a 2—or 3-dimensional model (in any suitable format, such as a digital or computer readable format) reflecting shape and configuration of the portion of the workpiece to be supported, and optionally of the physical changes to be made thereto by the precision processing.

The target pattern may include, for example, a machining, cutting or etching pattern to be applied to a workpiece. The target pattern may include, or be based upon, a surface topology of a workpiece. The method may comprise generating the target pattern as disclosed below.

The precision processing of the sheet material may include any method of combination of methods for forming the outline of the blades from the sheet material.

The precision processing may comprise laser machining the sheet material. The precision material processing may comprise chemical etching, photochemical machining, electrical discharge machining, water jetting or precision mechanical CNC machining.

The workpiece may be a sheet material, such as stainless steel, nickel or the like.

A fixture may be formed from interlocking support blades (by way of slots or other interlocking formations); or may comprise support blades that interlock with other components (e.g. a base or a frame) to form a fixture.

Alternatively, the support blades may be glued, soldered or welded together and/or to other components of the fixture. The support blades may be coupled using mechanical fixings, such as bolts, clips or the like. Coupling may be achieved by a combination of such measures.

Accordingly, constructing the target material fixture may comprise coupling the fixture components together and/or to other said components by one or a combination of these measures. Constructing the target material fixture may be conducted manually, or construction may be at least partially automated.

The target workpiece fixture may be constructed from one or more support blades extending in a first direction interlocking with one or more components (which may themselves be blades) extending in a second direction, which is typically orthogonal to the first direction.

In certain embodiments, the support blades extending in the first direction are provided with slots extending from a lower edge and the support blades extending in the second direction are provided with slots extending from an upper edge, the respective slots being coupled together in use.

The support blades may be evenly spaced. The support blades may form a grid pattern, such as an orthogonal or triangular grid pattern.

The support blades may be evenly spaced in one or both of the first and second directions. In some embodiments, the spacing of the support blades varies in different regions of the workpiece support.

The support blades of an assembled target workpiece fixture may extend parallel to one another in a first, second and in some embodiments a third direction.

The support blades may be non-parallel in at least a region of the workpiece support.

In some embodiments, some or all of the support blades may be curved. That is to say, a support blade of a sheet material may be flexed or bent during assembly of the target workpiece fixture. This may be desirable for example to provide additional support in some regions to a workpiece, in use.

The number of blades per unit length across a workpiece support may be referred to in the art as the "number density" or "pitch" of the blades. Thus, the number density or pitch may be varied in different regions of the target material fixture.

The target workpiece fixture may comprise one or more peripheral components, for example at the beginning and end of an array of support blades. These may be peripheral blades.

The method may comprise precision processing the peripheral blades the sheet material. A peripheral blade may also be a support blade.

Alternatively, the peripheral components may be standardised parts.

The target workpiece fixture may comprise one or more base components, onto which the support blades are coupled. The base components may be base blades, which lack any locus forming part of the workpiece support. The base blades may be provided with slots extending from their upper edges to couple to support blades. One or more of the base blades may be peripheral blades.

The peripheral and/or base components may be adapted to move or carry the target material fixture, for example using eyelets in the peripheral fixture components.

By "upper" and "lower" we refer to the orientation of the respective features during the intended use to the target workpiece fixture.

It will be understood that the generic material fixture may be of generally similar configuration to the target material fixture, but having a generic workpiece support as described herein.

Precision processing the sheet material to form the support blades may comprise machining an outline of the support blades, and optionally base and/or peripheral blades (including any required interstices and/or interlocking formations).

It will be understood that, optionally, one or more tabs may be retained between a machined blade and the surrounding sheet material, and that the machined sheet may be removed from a machining apparatus and the fixture components subsequently separated therefrom.

The method may comprise indexing the support blades. The support blades may be indexed by/during precision processing (e.g. laser machining).

Indexing may comprise positioning interlocking formations (by which the blades are coupled during constructing the target workpiece fixture) to ensure that the target workpiece fixture can only be constructed one way.

Indexing may comprise providing the blades and any other components with indicia (e.g. numbers, symbols and/or letters) indicating the order or position of each blade/component in the target workpiece fixture.

Laser machining may be conducted using laser machining apparatus, such as the Tannlin T-series of stencil laser systems (Tannlin is a trade mark). The CNC control over laser machining processes, and the features of the associated apparatus are known to those skilled in the art.

In particular embodiments, the method may be used in conjunction with laser machining apparatus having a ventilated well for a fixture.

In use, a fixture is placed in a well and an air (or in some instances an inert gas) flow established, for example by applying a reduced pressure to the well by a vacuum pump, Venturi or the like. A workpiece to be machined is placed over the well (typically by automated robotics, rollers or the like) and the reduced pressure assists in removal of fumes or ablated material and, particularly where the workpiece is a sheet, suction may also assist in retaining the workpiece in position.

The sheet material may be precision processed while supported on a generic material fixture in the well. The sheet material may extend across the well.

The target material fixture may be for use in a ventilated well.

The target material fixture made in accordance with the invention has fewer gaps between the workpiece and the workpiece support than a generic material fixture, particularly those constructed from interlocking blades. This reduces problems such as a portion cut out from a workpiece falling into the well. This in turn may provide for improved precision of the precision manufacturing process.

In some circumstances, where the target material fixture is for use in precision machining, since collateral machining is substantially eliminated, a higher number of fixture components (in particular blades) may be used, which may also assist in workpiece retention by suction.

Precision processing to form the support blades may comprise following a support blade machining pattern.

The method may comprise generating the support blade machining pattern based on the target pattern.

The method may comprise determining the coincidence between the target pattern and a model of the support loci of the target workpiece support; and determining the location of the or each required interstice therefrom.

An interstice may be required where the target pattern and the model of the support loci coincide (for example where the target pattern includes locations where the workpiece is to be physically modified—such as by machining the workpiece).

An interstice may be required where the target pattern and the model of the support loci do not coincide (for example where the target pattern includes locations where clearance is required to accommodate a structure—such as a component extending from a circuit board).

The method may comprise aligning all or a selection of a template workpiece support model and all or a corresponding selection of the target pattern. When the template workpiece support model and the target pattern (or selections thereof) are aligned, the coincidence therebetween may be determined.

A template workpiece support model may for example be a model of the support loci having an envelope configured to support a planar surface or a concave or convex surface, of a workpiece to be supported. A corresponding target pattern may comprise generally the same envelope to be aligned therewith, with one or more additional features.

The template workpiece support model may form part of a template fixture model (i.e. of an entire template fixture).

The one or more additional features may comprise one or more locations of physical changes to be made during a precision manufacturing process. The one or more additional features may comprise a location of one or more irregularities in the envelope, such as a location of an electrical component.

Whilst other coordinate systems may be used, a said model or pattern is typically defined in terms of cartesian coordinates, the Z-axis normally representing the intended vertical axis of the fixture or workpiece that the model represents. The X- and Y-axes are correspondingly representative of the horizontal axes.

Conveniently, the X-axis of the model may be aligned with the intended orientation of an array of support blades (i.e. a first orientation). In some embodiments, the Y-axis is also aligned with support blades (i.e. a second orientation).

The X-axis of the model may therefore be aligned with another feature of the intended target material fixture, such as a periphery thereof. Alternatively, or in addition, the alignment may be based upon the orientation of the target workpiece fixture in relation to a precision processing apparatus.

A selection of the said model and pattern may comprise a cross section through the model or pattern, or a line across the model or pattern. A said line may be straight or, in some embodiments, curved along at least a part of the selection.

A cross section through the model or pattern may be a planar cross section (for example in an XZ or a YZ plane), or may be non-planar cross section (for example aligned with the Z-axis along a non-linear support locus).

The method may comprise generating a first cross section of the template workpiece support model corresponding to the position of a first support blade and generating a corresponding first cross section of the target pattern. (By corresponding first cross section, we mean sharing the same coordinate values as the first cross section of the template workpiece support model).

The method may comprise generating a first cross section of the template workpiece support model in a first XZ-plane corresponding to the position of a first support blade, and a corresponding first cross section of the target pattern in the first XZ-plane.

It is to be understood that since the first cross section (e.g. in a first XZ-plane) is defined to correspond with the position of a support blade, the cross section of the template workpiece support model comprises an outline of at least the support locus and optionally (where a template fixture model is used) an entire outline of the respective blade.

The said first cross sections may be aligned and the location or any required interstices determined based on where the first cross sections coincide.

The location of the or each interstice may be user selected, for example based on a graphical interface.

The location of the/each interstices may be automatically determined, for example by identifying any deviation between the said cross sections, wherein an interstice may be required at or away from any such deviation.

Complimentarily, the location of the/each interstices may be automatically determined by identifying any coincidence between the said cross sections, wherein an interstice may be required at or away from any such coincidence.

The method may comprise generating a second cross section of the template workpiece support model corresponding to the position of a second support blade and generating a corresponding second cross section of the target pattern.

The method may comprise generating the second cross section of the template workpiece support model in a second XZ-plane and the second cross section of the target pattern in the second XZ-plane.

These steps may be repeated for the position of each support blade. In some embodiments these steps may be conducted in relation to a first and optionally one or more second YZ-planes.

Where the target pattern is 2-dimensional (e.g. a machining or cutting pattern across a flat surface), aligning the template workpiece support model and the target pattern may be conducted in 2-dimensions.

That is to say, the method may comprise selecting a first line (e.g. a line having a first X-value) across the template workpiece support model corresponding to the position of the support locus of a first support blade); plotting a corresponding first line (e.g. having the first X-value) across the target pattern; and determining the required location of any interstice or interstices based on the coincidence(s) between the first line and the target pattern. The method may comprise plotting one or more second lines (e.g. having a second X-value) across the target pattern. The method may comprise plotting one or more lines having a Y-value. The method may be repeated for the position of the support locus of each blade. This amounts in effect to determining where the template workpiece support model and the target pattern overlap or intersect.

One or more said lines or cross sections may be curved.

The method may comprise configuring the or each interstice, for example be applying a required clearance around, to each side (i.e. in the x direction) and/or below (i.e. in the z-direction) the said deviations or coincidences.

The method may comprise generating a support blade outline from each said selection of the model, comprising any determined and configured interstices. Each blade outline may be arrayed to form the support blade machining pattern.

A blade outline may be generated by combining a portion of the blade outline generated by aligning, with a generic outline. For example, a generic outline may correspond to the outline of support blades lacking any interstices, or to the portions of an outline other than that defining a support locus. A generic outline may comprise indices as disclosed above.

The invention extends in a second aspect to a method of generating a support blade machining pattern, for use in precision processing a sheet material to form support blades of a workpiece fixture; the method comprising:

providing a target pattern;
providing a model of support loci of a target workpiece support;
determining the coincidence between the target pattern and a model of the support loci of the target workpiece support; and
determining the location at least one interstice based on the coincidence; and
generating a support blade machining pattern comprising the outline of each support blade for the workpiece fixture, wherein at least one said outline at least one interstice.

It is to be understood that the steps will be conveniently be conducted in silico, with the aid of a computer processing resource, using suitable software.

The target pattern and/or the model may be provided using CAD methods, for example, as will be known to those skilled in the art.

In some embodiments, providing the target pattern may comprise laser scanning a surface, for example a surface of a workpiece to be supported by the target material fixture. Methods, software and associated apparatus for laser scanning a surface and generating computer modelling data therefrom, such as the target pattern, are well known to those skilled in the art.

The invention extends in a third aspect to; a computer processing resource configured to execute the steps of the method of the second aspect; and in a fourth aspect to computer readable storage media storing software for conducting the method of the second aspect.

The processing resource or software may comprise a data store, corresponding to each of or both of the target pattern and model.

The processing resource or software may comprise a comparator module, in communication with the or each data store, for determining the coincidence between the target pattern and the model.

The processing resource or software may comprise a selector module, for taking one or more selections of the target pattern and one or more corresponding selections of the model (such as a cross section therethrough or a line thereacross). The selector module may be in communication with the/each data store and the comparator module, or may form a part of the comparator module.

The processing resource or software may comprise a machining pattern generation module for generating an outline of a blade corresponding to each said selection.

A said or a further data store may comprise generic blade outline data, to be combined by the machining pattern generation module, with the determined location of the or each interstice.

In some embodiments, a fixture machining pattern may be generated by a first processing resource, for example running on a first computer, and transferred to a second processing resource forming part of or in communication with a processing resource forming part of precision processing apparatus, such as a laser machining apparatus.

The method is not limited to any particular configuration or combination of computing devices or processing resources; and may be performed over a network or using multiple devices, executing suitable software code.

According to a fifth aspect of the invention there is provided a method of precision manufacturing one or more, or a plurality of parts, the method comprising:
  providing a generic material fixture and a sheet material supported on the generic material fixture;
  precision processing the sheet material to form support blades for a target workpiece fixture; each support blade having a support locus; the support locus of at least one said support blade having at least one interstice; and
  constructing a target workpiece fixture comprising the support blades; wherein the support loci together define a workpiece support and wherein the or each interstice is positioned based on where a target pattern and the support loci coincide;
  supporting a workpiece on the target material fixture; and
  performing said precision manufacturing process on the workpiece, to form one or more said parts.

The precision manufacturing process may be an assembly process, such as circuit board assembly. The precision manufacturing process may be a precision machining process, such as laser machining (routing, cutting), water jetting, mechanical machining, chemical etching, or the like.

The precision processing and precision manufacturing process may be of the same general type, optionally performed using the same apparatus. For example, a laser machining apparatus may be used to make the target material fixture and the laser machining apparatus and target material fixture together used to make the/each part.

The method may comprise precision manufacturing more than one part from the workpiece.

The method may comprise precision manufacturing one or more parts from each of two or more workpieces in turn.

The workpiece may be in the form of a sheet material.

In a sixth aspect of the invention there is provided a target material fixture adapted for supporting a workpiece during a precision manufacturing process, the target material fixture comprising two or more support blades coupled together;
  each support blade having a support locus and the support locus of at least one said support blade having at least one interstice;
  wherein the support loci together define a workpiece support for supporting the workpiece in use; and wherein the or each interstice is positioned to provide a clearance between the workpiece support and the workpiece in predetermined locations based on the precision manufacturing process.

The number density or pitch may be varied in different regions of the target material fixture, as described above in relation to the first aspect.

The precision manufacturing processing may be a precision machining process, such as laser machining. Chemical etching, water jetting, photochemical machining, electrical discharge machining, precision mechanical machining and the like may also be performed.

The precision machining process may comprise following a target machining pattern. The or each interstice may be positioned based on where the target machining pattern and the support loci coincide.

The invention in extends in a seventh aspect to a material processing apparatus comprising a target material fixture in accordance with the sixth aspect. The apparatus may comprise a ventilated well, and the target material fixture may be in the well, or sized to be so positioned.

The material processing apparatus may be laser machining apparatus.

Further features of each aspect of the invention correspond to further features of any other aspect of the invention.

DESCRIPTION OF THE DRAWINGS

Example embodiments will now be described with reference to the following Figures in which:

FIGS. 5(a)-(e) are schematic illustrations of the steps of generating a support blade machining pattern.

DETAILED DESCRIPTION OF EXAMPLE EMBODIMENTS

Figure 1:
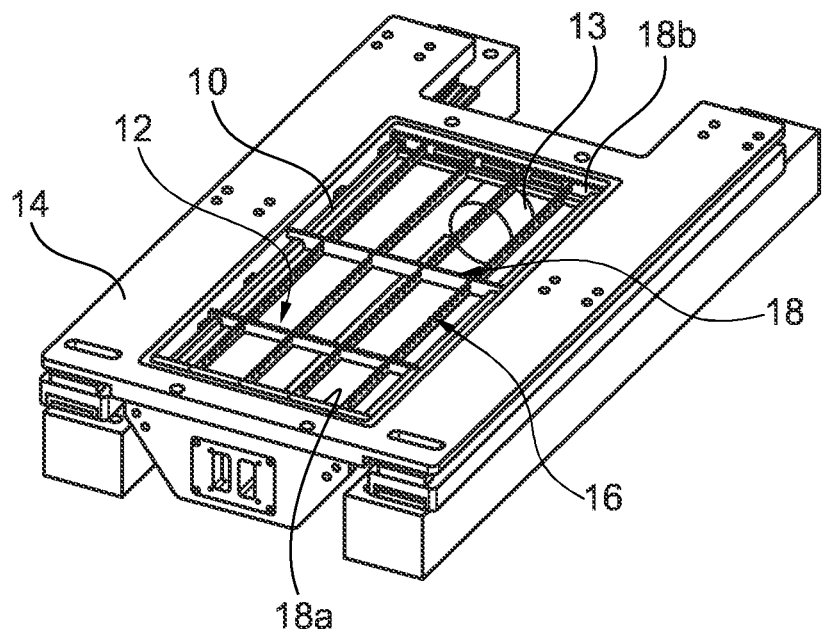
FIG. 1 is a perspective view of a generic material fixture in the well of a laser machining apparatus.

FIG. 1 shows a generic material fixture 10 positioned in the well 12 of a laser machining apparatus 14. The laser machining head has been omitted for clarity. Also visible in FIG. 1 is a vent 13 from the well 12. In used, a reduced pressure can be applied to the vent to draw away fumes and dust generated during machining.

The fixture 10 includes an array of longitudinal blades 16 and an array of transverse blades 18, coupled together by interlocking slots (not shown). In the example shown, the longitudinal blades 16 have slots extending to a lower edge and the transverse blades 18 have slots positioned to cooperatively engage therewith, extending to an upper edge. The generic material fixture 10 can thus be lifted by the transverse blades 18; and peripheral transverse blades 18a, 18b are provided with eyelets 19 for this purpose.

Figure 2:
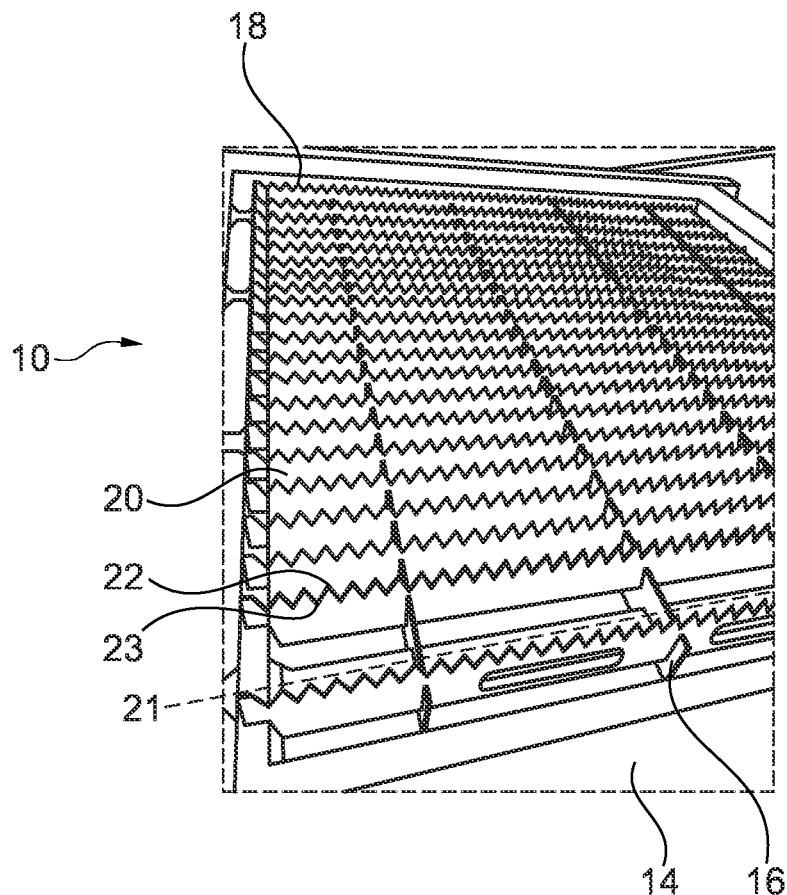
FIG. 2 is a close-up photograph of the generic material fixture

As can be seen in the photographic close up view of the fixture 10, in FIG. 2, the upper parts of the blades 16, 18 are provided with triangular crenellations 20; the tip 22 of which are coplanar. Accordingly, the crenellations of each blade define a linear (in the example shown) support locus 21. The support loci of each of the blades 16, 18 define a workpiece support.

Figure 3A:
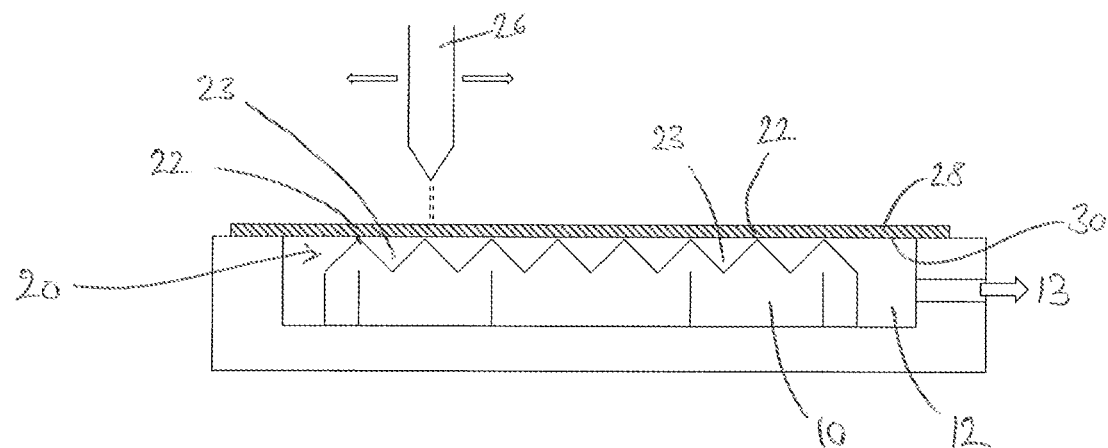
FIGS. 3(a) and 3(b) show a schematic cross-sectional side view of the apparatus of FIG. 1, during a laser machining process.
Figure 3B:
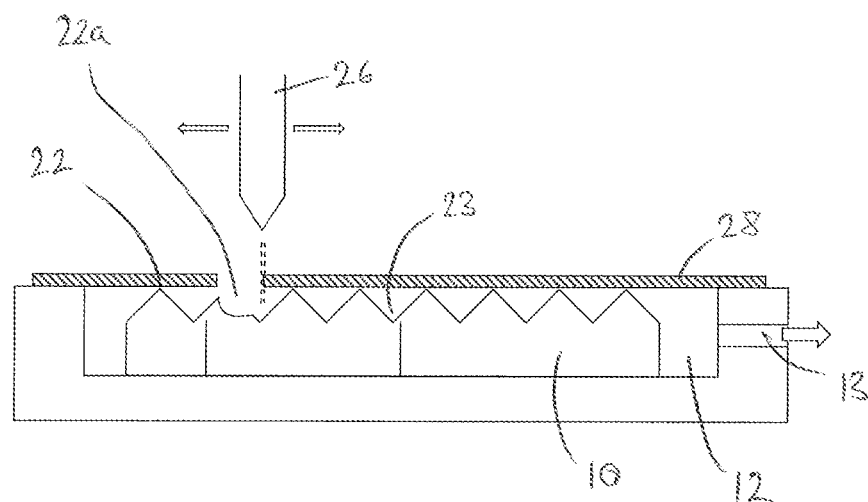

FIGS. 3(a) and 3(b) show a schematic cross-sectional side view of the apparatus of FIG. 1, during a laser machining process. The laser machining head 26 directs a focused laser beam at a workpiece 28 (in the example shown a sheet material) which is supported by the fixture 10 across the well 12.

Between the tips 22 of the crenellations 20 are a regular array of interstices 23 (V-shaped in this instance), which provide a regular array of clearances between the tips 22 running along the support locus 21, upon which the underside 30 of the workpiece 28 is supported.

The laser beam vaporizes material from the workpiece according to a predetermined machining pattern. Since the position of the crenellations 20 and interstices 30 are unrelated to any particular machining pattern, normally in at least some regions the tips 22, such as the tip 22a shown in the figure, are underneath or close to where the machining pattern crosses a blade.

Where the material forming a blade is close to a machining pattern, the laser beam may vaporize both the workpiece 28 and some of the material fixture 10, as illustrated in FIG. 3(b). Such collateral machining can cause vibration or movement of the workpiece (due to ejected plumes of material) and in addition limit the working lifetime of the material fixture 10.

The blades 16, 18 of a generic material fixture 10 of this type are therefore provided with a large number of interstices that are not required and, in addition, lack interstices to provide clearance in some regions where clearance is required.

Whilst illustrated for laser machining, similar issues may be associated with other forms of precision machining.

The present invention provides a method for manufacturing a target workpiece fixture in which interstices are located where the support loci coincide, so as to reduce or eliminate such collateral machining.

Figure 4A:
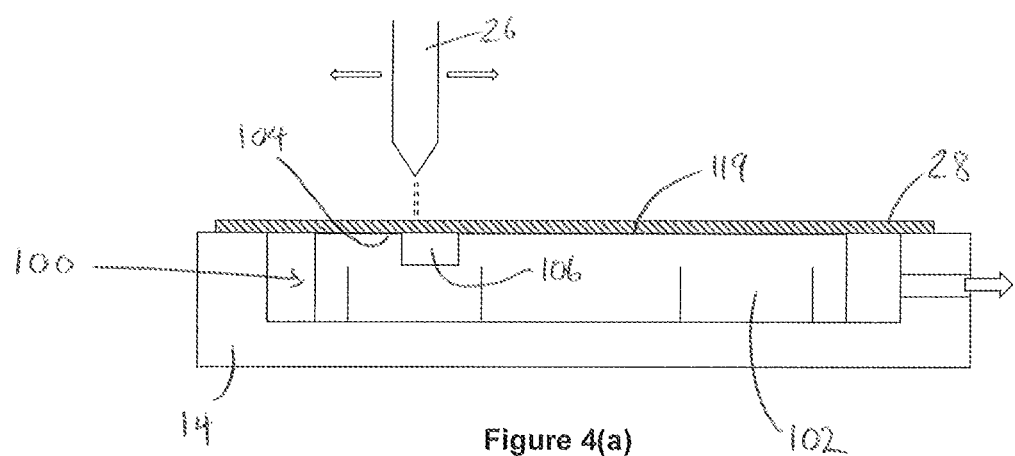
FIGS. 4(a) and 4(b) show a schematic cross-sectional side view of a target material fixture within the well of the laser machining apparatus, during a laser machining process.
Figure 4B:
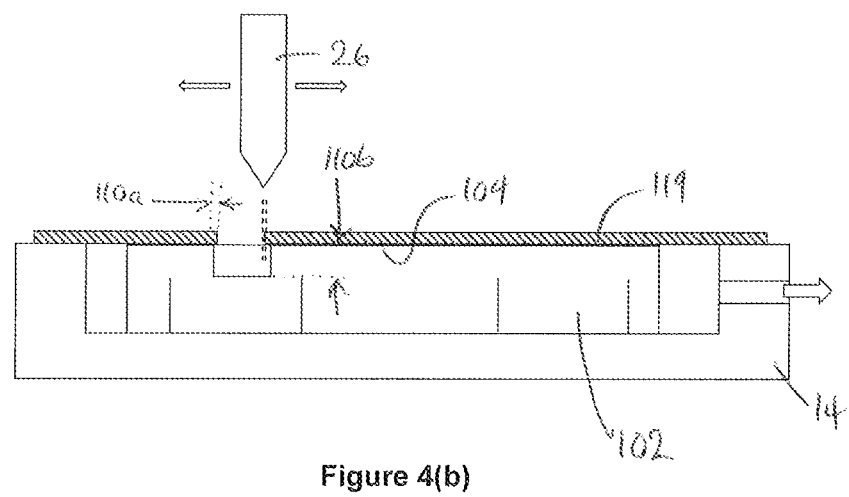

This is illustrated in FIGS. 4(a) and (b), which shows a corresponding blade 102 of a target workpiece fixture 100.

In contrast to the fixture 10, an upper edge 104 of the blade 102 runs along the support locus 119.

An interstice 106 (a slot or cut out from the upper edge 104 of the blade 102) is provided where the workpiece 28 above is to be machined. The interstice provides clearance underneath the workpiece, where the machining pattern and the blade 102 coincide (in this case in the vertical, Z-axis). Thus, the blade provides support along a far great portion of the support locus than the blades 16, 18 of the generic fixture 10, whilst at the same time providing a degree of both lateral 110a (i.e. in an x— or y— axis) and vertical 110b clearance between the blade 102 and the region 112 where the machining pattern coincides with the support locus 119.

The method includes providing a generic material fixture 10 as described above. A sheet material for forming blades of a target workpiece fixture 100 is supported on the generic material fixture 10.

Figure 7:
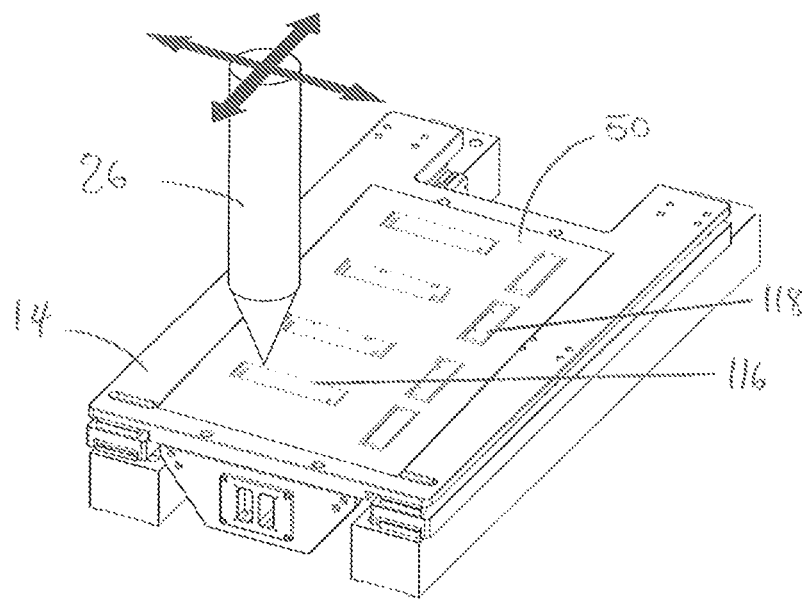
FIG. 7 shows a perspective view of a support blade machining pattern for a target material fixture being laser machined into a sheet material.

The outline of support blades of a target workpiece fixture 100 are then machined from the workpiece, sheet material 50 (see FIG. 7).

A support blade machining pattern, to be machined into the sheet material is generated based on the coincidences between a target machining pattern and a model of the support loci of the workpiece support.

With reference to FIG. 5(a), in one example, the model of the support loci comprises a 2D grid pattern 115, where grid lines in the X-axis represent the positions of the support loci 119x of longitudinal blades and support loci 119y of transverse blades. Optionally, the grid pattern may be generated from a 3D model of a template fixture, by plotting lines at a Z-axis value corresponding to the workpiece support along each X- and Y-value corresponding to the position of a corresponding blade.

To determine the required locations of interstices, a target pattern 200 (in this case a laser cutting pattern) and the grid pattern 115 are aligned (FIG. 5(b)). The intersections 120 between the grid 115 and the target pattern 200 (i.e. where the two coincide) represent the required positions of the interstices 106. An example is illustrated in the exploded view, A.

In the example shown, the interstices can be a standardized size to provide the required clearance. The profile of the upper edges of each blade can be derived by the provision of an outline of an interstice into the template upper blade edge.

In alternative examples, the workpiece support model can also represent the thickness of the sheet material, wherein the dimension of an interstices is determined by the difference between the maximum and minimum X- or Y-values (as the case may be) that the aligned model and pattern coincide.

An outline of each blade of the target material fixture can then be generated from the upper edge profile of each blade, applied to a generic outline of the remainder of the blade. An example of the profile 133 of the upper edges of a longitudinal blade 118c is shown in FIG. 5(c), with the positions 106a of interstices 106 positioned the locus 119x as determined by aligning the patterns as described above.

In a next step (FIG. 5(d)) this is combined with a generic outline 134 of a blade, to create a blade outline pattern 136.

As illustrated in FIG. 5(e), this process is repeated for each blade 116, 118 and each outline 136 is then arrayed to form a support blade machining pattern 140.

Optionally, the support blade machining pattern may be indexed, to assist in constructing the target material fixture with the blades in the correct order. This can be achieved by machining indicia into the sheet material 50 and/or by ordering and positioning of the outlines on the support blade machining pattern and/or in some embodiment the configuration (e.g. depth) of the respective slots 134 by which the blades are coupled.

The support blade machining pattern 140 is then cut into a sheet of material 50, which is supported in a well 12 by a generic material fixture 10, as shown in FIG. 7. The support blades 116, 118 are then pressed from the sheet and assembled into a target material fixture (these conventional assembly steps are not illustrated). The target material fixture may then be used to manufacture parts by following the target pattern 200.

Any collateral machining of the generic fixture 10 while following the support blade machining pattern 140 does not reduce the precision of the subsequent part manufacture using the target material fixture, since any variability in the position/dimensions of the interstices 106 is less (typically at least an order of magnitude) than the clearance between the workpiece and the target material fixture, where the target pattern 200 and support loci 119 coincide.

Figure 9:
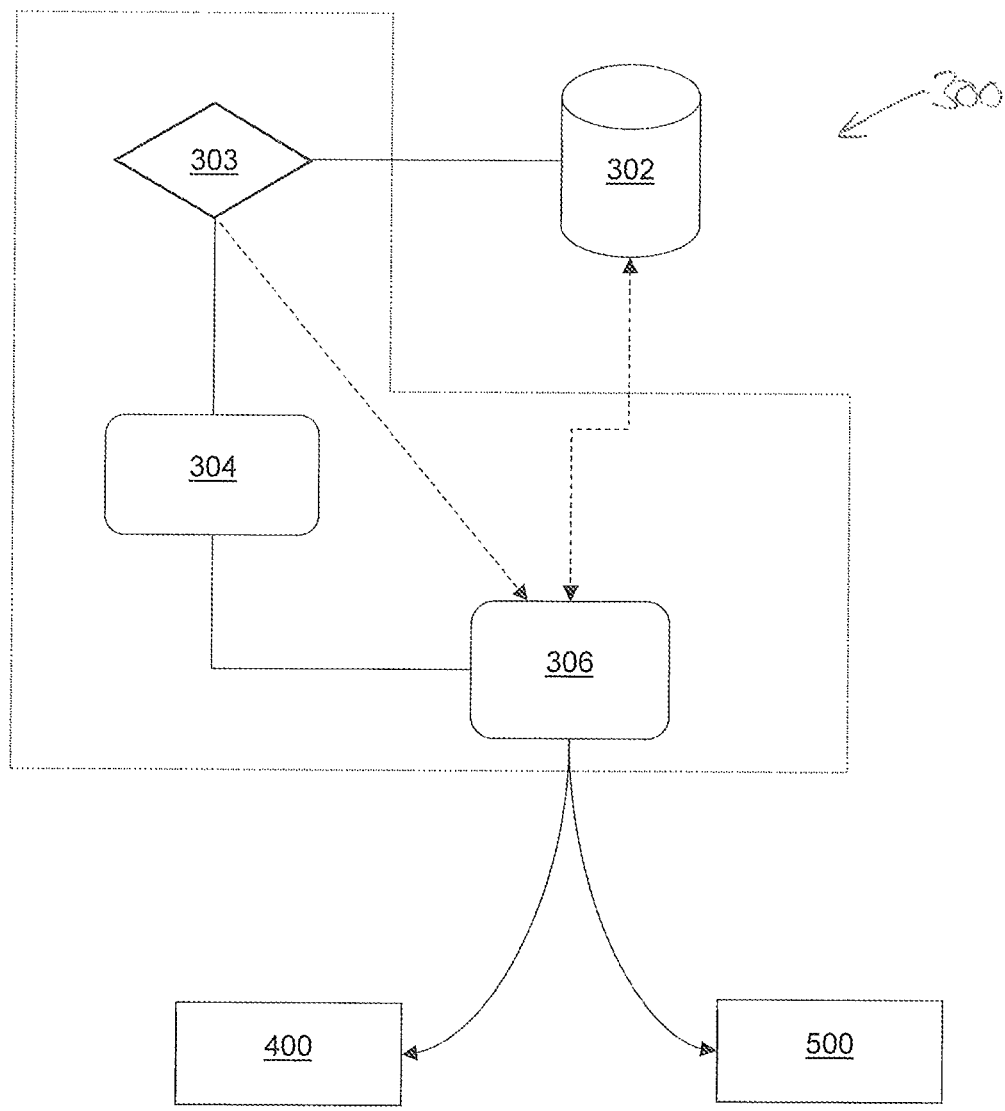
FIG. 9 is an example processor for generating a support blade machining pattern, from a template workpiece support model and a target pattern.

Whilst the foregoing steps of generating a support blade machining pattern may be conducted by hand, conveniently these steps are conducted in silico. A non-limiting example of suitable software or processing architecture for carrying out these steps is shown in FIG. 9.

Figure 6A:
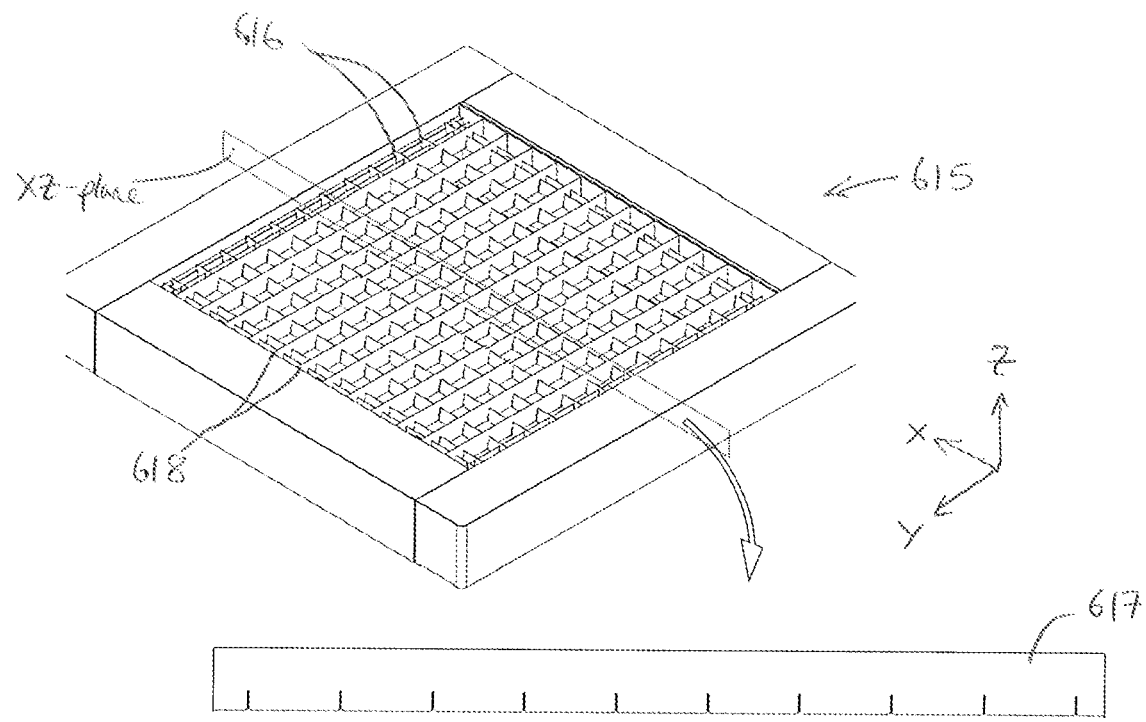
FIGS. 6(a)-(e) are schematic illustrations of an alternative embodiment of generating a support blade machining pattern.

With reference to FIG. 6(a), in one example, a 3D template workpiece support model 615 is provided. In this instance, the model 615 is of an entire template fixture. The model includes a representation of an array of blades 616 extending in the X-direction, and of blades 618 extending in the Y-direction. The support loci 619 of the blades 616, 618 together define a template workpiece support.

A selection of the model 615 is taken in an XZ-plane corresponding to the position of each of the blades 316. Thus, each cross section represents a generic blade outline. An example of an XZ-cross section 617 is shown. Selections are also taken through each of the YZ-planes corresponding to the positions of the blades 618 (not shown).

Figure 6B:
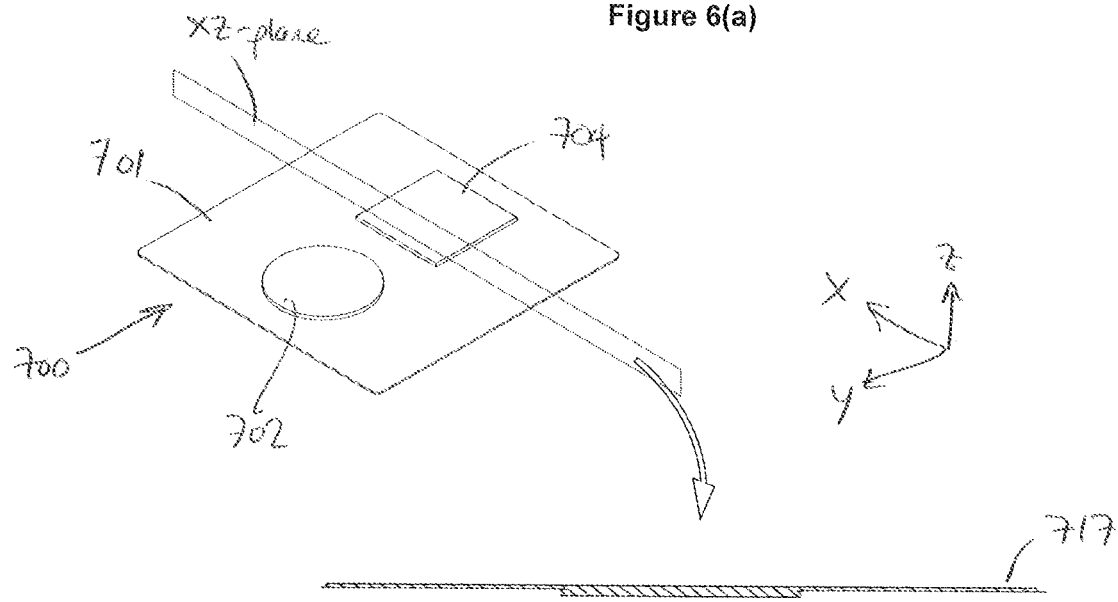

FIG. 6(b) shows a target pattern 700. In this example, the target pattern represents a circuit board substrate 701, to which components 702, 704 have already been attached and extend from a lower face thereof. The circuit board is the workpiece to be supported by the target workpiece fixture, without impinging upon the components 702, 704.

A selection of the target pattern 700 is taken in each XZ-plane and YZ-plane corresponding to the positions the blades 616, 618. An example of a cross section 717 corresponding to the cross section 617 is shown in FIG. 6(b).

Figure 6C:
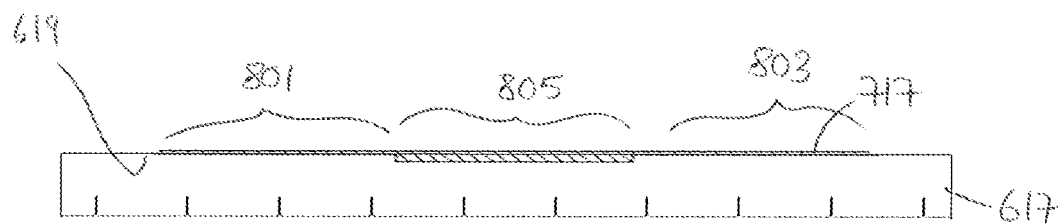

To determine the required locations of interstices, the corresponding cross sections are aligned. FIG. 6(c) shows the aligned cross sections 617 and 717 of the template model 615 and the target pattern 700. The position of the required interstice can then be determined based on the coincidence between these two selections.

When aligned the position of the support locus 619 and the position in the target pattern corresponding to the underside of the circuit board coincide along regions 801, 803. There is a deviation therebetween in region 805.

In this example, an interstice is required were the selections do not coincide, i.e. in the deviation region 805.

Figure 6D:
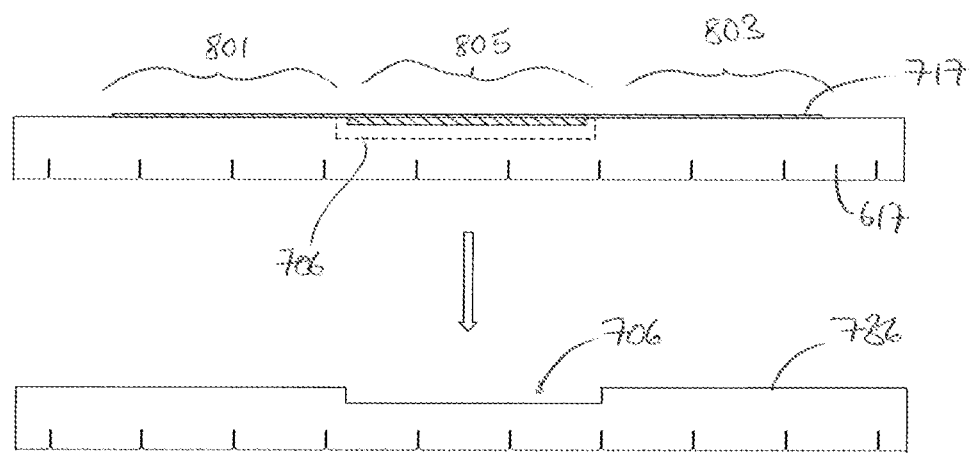

FIG. 6(d) shows the interstice 706 being configured by providing a clearance in the X-direction to either side of the component 702 and a larger clearance in the Z-direction below the component 702, and a blade outline pattern 736 is generated which comprises the required interstice 706.

Figure 6E:
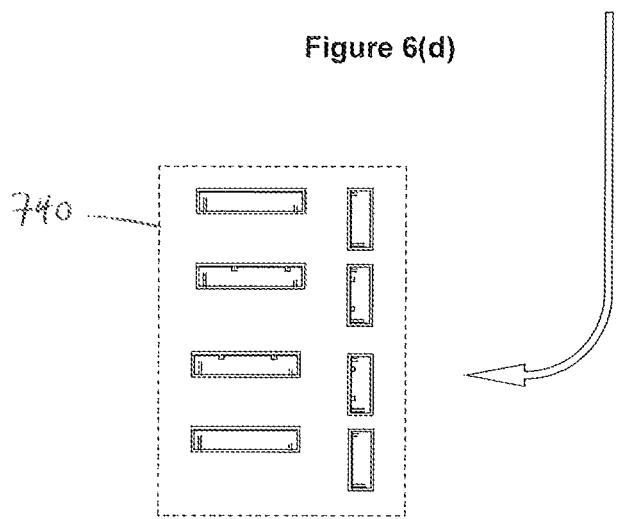

As illustrated in FIG. 6(e), this process is repeated for each blade 616, 618 and each outline 736 is then arrayed to form a support blade machining pattern 740.

Figure 8:
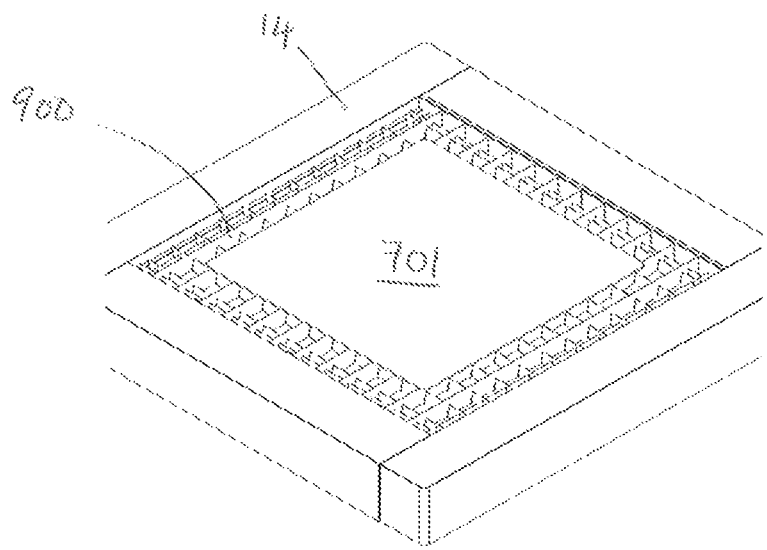
FIG. 8 is a perspective view of a workpiece on a target material fixture.

The support blade machining pattern 740 is then cut into a sheet of material 50, which is supported in a well 12 by a generic material fixture 10, as illustrated in FIG. 7. The support blades are then pressed from the sheet and assembled into a target material fixture 900 (these conventional assembly steps of slotting the blades together are not illustrated). The target material fixture 900 can then be used to support a workpiece 701 as shown in FIG. 8, in a precision manufacturing process, such as further circuit board assembly.

A processing resource 300 for generating a support blade machining pattern such as patterns 140 and 740, is shown in FIG. 9. The processing resource includes a data store 302, for example a hard drive or cloud storage arrangement, on which the target pattern 200, 700 and the model of the support loci of the target workpiece support. In some cases, a 3D model of the entire template material fixture is stored by the data store.

A comparator module 304 is provided to determine the coincidence(s) between the target pattern 200, 700 and the stored model 115, 615. A selector module 303 (separate from or forming part of the comparator module 304) may also be provided to select individual loci 119x,y from the model (or, in some embodiments, XZ— or YZ—slices 616, 618 therethrough, corresponding to the positions of the support blades, as described above in relation to FIG. 6), and provide these to the comparator module.

The comparator module 304 aligns the model and the pattern, or alternatively aligns the selections provided by the selector module with the corresponding selections of the target pattern 200, 700, to determine the positions of the interstices 106, 706 in relation to the support loci 119, 719, and generate upper edge profiles of the support blades 116, 118 or outlines 136, 736, as described above. In some embodiments, the upper edge profiles are generated by a machine pattern generating module 306.

The machining pattern generating module 306 (which may form part of the comparator module) takes the upper edge profiles 133 and combines these with generic outlines 134 (which may also be stored on the data store 302, or which may be obtained from the selector module 303) to generate blade outline patterns 136 and array these to generate a support blade machining pattern 140. Alternatively, the machining pattern generating module 306 arrays the patterns 136, 736 generated by the comparator module to form the support blade machining pattern.

The pattern 140, 740 may be stored on the data store 302 and/or output to a further computing device 400 (e.g. running on a precision machining apparatus), or storage medium 500.

Whilst exemplary embodiments have been described herein, these should not be construed as limiting to the modifications and variations possible within the scope of the invention as disclosed herein and recited in the appended claims.

The invention claimed is:

1. A method of manufacturing a workpiece fixture, for supporting a workpiece in a precision manufacturing process; the method comprising:
   providing a generic material fixture and a sheet material supported on the generic material fixture;
   precision processing the sheet material to form support blades for a target workpiece fixture, each support blade having a support locus, the support locus of at least one said support blade having at least one interstice, wherein each interstice is a gap or break in a continuous support locus, wherein a majority of a length of each support locus is defined by an edge of the support blade, and a minority of the length by each interstice; and constructing a target workpiece fixture comprising the support blades, wherein the support loci together define a workpiece support and wherein the at least one interstice is positioned based on where a target pattern and the support loci coincide.

2. The method of claim 1, wherein each support locus is linear, and wherein the loci are co-planar, together defining a workpiece support for a planar workpiece.

3. The method of claim 1, wherein one or more or each said interstice is a slot or an indent in a said support locus.

4. The method of claim 1 wherein, wherein the target pattern is a 2—or 3-dimensional model reflecting a shape and configuration of a portion of the workpiece to be supported.

5. The method of claim 1, wherein the target pattern includes a machining, cutting or etching pattern to be applied to the workpiece.

6. The method of claim 1, wherein the precision processing of the sheet material comprises laser machining the sheet material, or wherein the precision processing comprises chemical etching, photochemical machining, electrical discharge machining, water jetting or precision mechanical CNC machining the sheet material.

7. The method of claim 1, comprising forming the target workpiece fixture by interlocking the support blades, by way of slots or other interlocking formations, to form the target workpiece fixture.

8. The method of claim 1, wherein precision processing the sheet material to form the support blades comprises following a support blade machining pattern and wherein the support blade machining pattern is generated based on the target pattern.

9. The method of claim 1, comprising determining the coincidence between the target pattern and a model of the support loci of the target workpiece support; and determining the location of the at least one required interstice therefrom.

10. The method of claim 9, wherein said interstice is required where the target pattern and the model of the support loci coincide; and/or wherein a said interstice is required where the target pattern and the model of the support loci do not coincide.

11. The method of claim 9, comprising aligning all or a selection of a template workpiece support model and all or a corresponding selection of the target pattern, and determining the coincidence therebetween.

12. The method of claim 9, comprising:

generating a first cross section of the template workpiece support model corresponding to the position of a first support blade, and a corresponding first cross section of the target pattern;

aligning the cross sections; and determining the location of any required interstice(s) based on where the cross sections coincide.

13. The method of claim 12, comprising generating a cross section of the template workpiece support model in a one or more XZ— and/or YZ-planes corresponding to the position of one or more support blades, and a generating corresponding cross section of the target pattern in the one or more XZ— and/or YZ-planes; aligning the cross sections; and determining the location of any required interstice(s) based on where the cross sections coincide.

14. The method of claim 9, wherein the target pattern is 2-dimensional, the method comprising selecting a first line across the template workpiece support model and plotting a corresponding first line across the target pattern and aligning the lines to determine the required location of any interstice or interstices.

15. A method of precision processing a sheet material, the method comprising:

generating a support blade machining pattern, the generating a support blade machining pattern comprising: for use in precision processing a sheet material to form support blades of a target workpiece fixture; the method comprising:

providing a target pattern;

providing a model of support loci of a target workpiece support;

determining coincidence between the target pattern and a model of the support loci of the target workpiece support; and determining a location at least one interstice based on the coincidence; and generating the support blade machining pattern, comprising an outline of each support blade for the target workpiece fixture, wherein at least one said outline comprises at least one interstice, wherein each interstice is a gap or break in a continuous support locus, wherein a majority of a length of each support locus is defined by an edge of the support blade, and a minority of the length by each interstice; and precision processing the sheet material by following the support blade machining pattern and machining at least a part of the outline of each support blade through the sheet material.

16. The method of claim 1, comprising providing the target pattern by laser scanning a surface of a workpiece to be supported by the target workpiece fixture.

17. The A method of claim 1 comprising:

supporting a workpiece on the target workpiece fixture; and performing said precision manufacturing process on the workpiece, to form one or more parts from the workpiece.

18. The method of claim 17, comprising precision manufacturing more than one part from the workpiece, and/or precision manufacturing one or more parts from each of two or more workpieces in turn.

19. A target material fixture adapted for supporting a workpiece during a precision manufacturing process, the target material fixture comprising two or more support blades coupled together;

each support blade having a support locus and the support locus of at least one said support blade having at least one interstice; wherein each interstice is a gap or break in a continuous support locus, wherein a majority of a length of each support locus is defined by an edge of the support blade, and a minority of the length by each interstice;

wherein the support loci together define a workpiece support for supporting the workpiece in use; and wherein the at least one interstice is positioned to provide a clearance between the workpiece support and the workpiece in predetermined locations based on the precision manufacturing process.

20. The method of claim 15, comprising providing the target pattern by laser scanning a surface of a workpiece to be supported by the target workpiece fixture.

* * * * *